(12) United States Patent
Kuraishi et al.

(10) Patent No.: US 9,336,049 B2
(45) Date of Patent: May 10, 2016

(54) METHOD, SYSTEM, AND PROGRAM FOR SCHEDULING JOBS IN A COMPUTING SYSTEM

(71) Applicant: FUJITSU LIMITED, Kawasaki-shi, Kanagawa (JP)

(72) Inventors: Hideaki Kuraishi, London (GB); Akira Ishisaka, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/474,901

(22) Filed: Sep. 2, 2014

(65) Prior Publication Data

US 2015/0067689 A1 Mar. 5, 2015

(30) Foreign Application Priority Data

Sep. 3, 2013 (EP) .................................... 13182892

(51) Int. Cl.
- G06F 9/46 (2006.01)
- G06F 9/48 (2006.01)
- G06F 9/50 (2006.01)

(52) U.S. Cl.
CPC ............ *G06F 9/4843* (2013.01); *G06F 9/5055* (2013.01); *G06F 9/5044* (2013.01)

(58) Field of Classification Search
CPC ... G06F 9/4843; G06F 9/5027; G06F 9/5044; G06F 9/5055
USPC .......................................................... 718/102
See application file for complete search history.

(56) References Cited

U.S. PATENT DOCUMENTS

| | | | |
|---|---|---|---|
| 7,284,244 B1 | 10/2007 | Sankaranarayan et al. | |
| 8,020,161 B2* | 9/2011 | Markov | G06F 9/4818 718/103 |
| 8,799,911 B2* | 8/2014 | Santoli | G06Q 10/00 718/101 |
| 8,856,793 B2* | 10/2014 | Picinich | G06F 9/485 718/102 |
| 2001/0011253 A1 | 8/2001 | Coley et al. | |
| 2003/0088516 A1 | 5/2003 | Remer et al. | |
| 2005/0010608 A1* | 1/2005 | Horikawa | G06F 9/4862 707/999.2 |
| 2005/0273436 A1 | 12/2005 | Coley et al. | |
| 2006/0288251 A1 | 12/2006 | Jackson | |
| 2007/0101336 A1* | 5/2007 | Moore | G06F 8/60 718/102 |
| 2008/0066070 A1* | 3/2008 | Markov | 718/103 |
| 2008/0120619 A1* | 5/2008 | Podila | 718/102 |
| 2008/0134175 A1 | 6/2008 | Fitzgerald et al. | |

(Continued)

OTHER PUBLICATIONS

Lee et al., "Capacitated two-parallel machines scheduling to minimize sum of job completion times", 1993, Elsevier Science.*

(Continued)

*Primary Examiner* — Anna Deng
*Assistant Examiner* — Junchun Wu
(74) *Attorney, Agent, or Firm* — Staas & Halsey LLP

(57) ABSTRACT

Embodiments of the present invention include a job scheduling system configured to schedule job execution timings in a computing system; the job scheduling system comprising: a job information receiving module configured to receive job information defining a job pending execution in the computing system, the job information including an indication of computing hardware resources required to execute the job, and an indication of an allocation of application licenses required to execute the job; and a job execution scheduler configured to schedule execution of the job at a timing determined in dependence upon the availability of both the indicated computing hardware resources and the indicated application licenses.

12 Claims, 11 Drawing Sheets

(56) References Cited

U.S. PATENT DOCUMENTS

| | | | |
|---|---|---|---|
| 2010/0175065 A1* | 7/2010 | Uchida | 718/102 |
| 2012/0096468 A1 | 4/2012 | Chakravorty et al. | |
| 2012/0198462 A1* | 8/2012 | Cham | G06F 9/5038 718/103 |
| 2012/0311591 A1* | 12/2012 | Watson | G06F 9/46 718/102 |
| 2014/0122565 A1* | 5/2014 | Subramanian | H04L 41/5096 709/203 |
| 2014/0201752 A1* | 7/2014 | Agrawal | G06F 9/5011 718/104 |

OTHER PUBLICATIONS

Mohamed et al., "Experiences with the KOALA Co-Allocating Scheduler in Multiclusters", 2005, IEEE.*

Feitelson et al., "Theory and Practice in Parallel Job Scheduling", Jul. 2005, Lecture Notes in Computer Science, vol. 1291, pp. 1-34.*

Polo et al., "Performance-Driven Task Co-Scheduling for MapReduce Environments", 2010, IEEE.*

Extended European Search Report issued May 19, 2014, in corresponding European Patent Application No. 13182892.3.

* cited by examiner

```
#@$-q b016          #Line 001   : specifies queue
#@$-lP 16           #Line 002   : number of nodes              ⎫
#@$-lp 2            #Line 003   : number of process            ⎬ Resource definition  142
#@$-llm 64mb        #Line 004   : required memory per process  ⎭
                    #Line 005
PATH=/opt/app/bin:$ PATH    #Line 006                          ⎫
export PATH                 #Line 007                          ⎪
                            #Line 008                          ⎪
APPDIR=/opt/app/bin         #Line 009                          ⎬ EnvironmentSettings  144
export APPDIR               #Line 010                          ⎪
                            #Line 011                          ⎪
cd $QSUB_WORKDIR            #Line 012                          ⎭
                            #Line 013
/usr/local/bin/isv-P-n 2    #Line 014   : execution command of ISV application 1   ⎫
$APPDIR/isv-Z-p 32          #Line 015   : execution command of ISV application 2   ⎬ ISV apps Execution  146
isv-K-p 4                   #Line 016   : execution command of ISV application 3   ⎭
```

| Steps | Real license server 300 | Proxy license server 130 |
|---|---|---|
| S01 Calculate required number of license | 100 | x |
| S02 Acquire license by IJMS | 80 | x |
| S03 Launch proxy license server | 80 | 20 |
| S04 Start of a batch job | 80 | 20 |
| S05 Start of execution of ISV application | 80 | 0 |
| S06 End of execution of ISV application | 80 | 20 |
| S07 End of a batch job | 80 | 20 |
| S08 Stop proxy license server | 80 | x |
| S09 Return license to RLS | 100 | x |

FIG. 9

METHOD, SYSTEM, AND PROGRAM FOR SCHEDULING JOBS IN A COMPUTING SYSTEM

CROSS REFERENCE TO RELATED APPLICATIONS

This application claims the benefit of European Application No. 13182892.3, filed Sep. 3, 2013, the disclosure of which is incorporated herein by reference.

BACKGROUND OF THE INVENTION

1. Field of the Invention

The present invention is in the field of computing, and in particular relates to scheduling jobs and tasks for performance in computing systems, for example, in computing systems which offer infrastructure and/or software as a service.

2. Description of the Related Art

Applications, such as independent software vendor (ISV) applications, are commonly used in computing activities in a variety of computing implementations and environments. For example, high performance computing (HPC) or computer-aided engineering CAE activities may include jobs which require processing to be performed by more than one different application, possibly with some level of parallelization, and corresponding licenses are required to access or make use of these applications. Job schedulers control reservation and acquisition of computing hardware resources such as CPUs, cores, and memory, so that jobs are scheduled when the required computing hardware resources are available. Users that have submitted jobs have to always pay attention to the availability of the application licenses, because the job scheduler does not control or communicate with the license manager.

In prior art systems, when a batch job script reaches the section where ISV applications are run, the entity running the batch job script tries to acquire the necessary licenses. If they are successfully acquired, the application is executed. However, if the entity fails to acquire the licenses, the batch job script is terminated due to the lack of licenses and a job scheduler notifies a user that the submitted job was terminated. From the job scheduler's point of view, it seems that the job has been completed and terminated, but when users look at the output file, they realize that the job was exited due to the lack of license.

Submitted jobs for which the required computing hardware resources have been reserved may be terminated suddenly due to the lack of availability of application licenses. Such termination may occur after a long wait in a job queue of pending jobs to acquire the computing hardware resources, and hence overall waiting times and efficiency of the computing system in using resources to execute jobs is reduced. Users need to resubmit a job again, and the efficiency of the work is reduced.

SUMMARY OF THE INVENTION

Embodiments of the present invention include a job scheduling system configured to schedule job execution timings in a computing system; the job scheduling system comprising: a job information receiving module configured to receive job information defining a job pending execution in the computing system, the job information including an indication of computing hardware resources required to execute the job, and an indication of an allocation of application licenses required to execute the job; and a job execution scheduler configured to schedule execution of the job at a timing determined in dependence upon the availability of both the indicated computing hardware resources and the indicated application licenses.

Advantageously, embodiments provide a mechanism which controls timing of job execution according to the status of application licenses; the job is not submitted for execution until both the application licenses and the computing hardware resources are available. Embodiments provide an integrated system for controlling the acquisition of hardware resources and application licenses for jobs and scheduling jobs when the necessary resources and licenses have been acquired. Embodiments comprise a job execution scheduler which is informed of the availability of both computing hardware resources and application licenses, so that jobs can be executed when both are available.

Embodiments of the present invention provide a job scheduling system which provides integrated application license and computing hardware resource management. For example, the job scheduling system is configured to receive job information such as a batch script and to analyze the received job information to identify applications for which licenses are required to run the job, and to extract or calculate the required number of licenses. The job scheduling system is configured to use the extracted or calculated required number of licenses to obtain, for example, by communication with license servers, a timing at which the licenses are available and hence when the job can be run, pending availability of computing hardware resources.

It is inherent that the indication of computing hardware resources required to execute the job are requirements insofar as they have been specified as being the computing hardware resources on which the job should be performed either in the job information or as derived from the job information by the job information receiving module. Thus, the computing hardware resources required for executing the job may be considered to be the computing hardware resources requested by a user for executing the job, or the computing hardware resources determined to be appropriate for executing the job by the job information receiving module based on the received job information. For example, the job information receiving module may have access to a lookup table for matching jobs to appropriate configurations of computing hardware resources.

Similarly, the indication of application licenses required to execute the job are requirements insofar as they have been specified as being the application licenses which the user would like to be used for executing the job, or the application licenses that it is derivable from the job information that the user would like to be used. For example, the user may specify a quality of service level or performance target, which in combination with other information about the job, enables the job information receiving module to derive appropriate allocations of licenses, for example, by reference to a lookup table. Thus, the indication of application licenses required to execute the job may be considered to be the application licenses requested by a user for executing the job, or the application licenses determined to be appropriate for executing the job by the job information receiving module based on the received job information.

Computing hardware resources are the configuration of hardware required to execute a job. For example, the computing hardware resources may be a combination of storage space, memory, cores, processors or nodes, and possibly network interfaces or other hardware. Computing hardware resources may be defined in terms of hardware required and a length of time for which they are required.

Application licenses may be considered to be rights to access and execute a set of processing instructions performing a particular function and having certain inputs and outputs. Such a set of processing instructions may be referred to as an application, and the right to access them referred to as a license. Jobs submitted to a computing system for execution may be executed with varying levels of parallelization, and thus more than a single license per application may be desirable or required. Applications may be independent software vendor (ISV) applications.

Embodiments may further comprise: a hardware scheduling module configured to reserve the indicated computing hardware resources on behalf of the job; and a license scheduling module configured to check for availability of the indicated application licenses on behalf of the job; wherein scheduling execution of the job comprises delaying instructing the computing system to execute the job until a time at which the reserved indicated computing resources are available.

The hardware scheduling module and license scheduling module provide a mechanism for determining a timing at which required resources (wherein resources collectively refers to computing hardware resources and application licenses) are available. The hardware scheduling module is configured to reserve the indicated computing hardware resources on behalf of the job. Such reservation may include cooperating with a computing hardware resource manager or controller to join a queue for access to the required computing hardware resources, and/or preventing the indicated computing hardware resources from being used by other jobs until the job is complete, at which point the computing hardware resources are released.

The license scheduling module is configured to check for availability of the indicated licenses, for example, by communicating with one or more real license servers. Checking for availability may be conducted by a process of issuing requests and awaiting responses, and requests may be sent periodically, or it may be possible to reserve licenses which are currently unavailable, and then to acquire the licenses when they become available.

It may be that the indication of application licenses required to execute the job comprises an indication of an optimum allocation of application licenses with which the job can be executed and an indication of a minimum acceptable allocation of application licenses with which the job can be executed; and checking for availability of the indicated allocation of application licenses on behalf of the job may include checking whether the optimum allocation of application licenses is available, and if not, checking whether an allocation of application licenses less than the optimum allocation and more than or equal to the minimum acceptable allocation of application licenses is available.

Optionally, if the checked allocation of application licenses is available, the license scheduling module is configured to acquire the available allocation of licenses on behalf of the job.

Advantageously, by effectively indicating a range of acceptable application license allocation, the above technique introduces some flexibility into the matching of jobs to available licenses, which overall ensures that application licenses are being used more often than if there is no flexibility. The optimum allocation is optimum in terms of being the largest allocation of licenses indicated in the job information. Optimum refers to the faster execution time associated with having more licenses, and to having preferred applications perform tasks. The minimum acceptable allocation of licenses is the last allocation of licenses that the license scheduling module will check for on behalf of the job. It may be that one or more allocations progressing from the optimum to the minimum acceptable will be checked for before checking for the minimum acceptable allocation. An allocation of licenses is a number of licenses per application for each of one or more applications. The applications may be constant from the optimum allocation to the minimum acceptable allocation. Alternatively, it may be that an application serves as a fallback option for an application included as part of the optimum configuration, so that some applications are different between the optimum allocation and the minimum acceptable allocation. Alternatively, it may be that the applications are fixed, and that the only difference between the optimum allocation and the minimum acceptable allocation is that in the minimum acceptable allocation fewer licenses of one or more applications are indicated.

As an option in embodiments, the license scheduling module may be configured to check for availability of the indicated allocation of application licenses on behalf a job until the application licenses are reserved or acquired or until an indicated timing by which the job is to be completed or started has past.

That is to say, the license scheduling module is configured to check for availability of the indicated allocation of application licenses on behalf a job until one or the other of the following two conditions is reached: the application licenses are acquired, or an indicated timing has past, the indicated timing being either a timing by which the job is to be completed or a timing by which the job is to be started.

In certain implementations, it may be that jobs can effectively time-out. That is to say, an acceptable time limit within which to start or complete the job is set by the user, and if the job is not completed by that time limit, or is not started by the time limit, then the job is no longer pending and is simply returned to the user as not completed. Such timing indications are optional, and in certain embodiments it may simply be assumed that jobs remain pending until they are executed. The checking may be performed periodically, and in certain implementations may be cyclic insofar as allocations of licenses from the optimum allocation down to the minimum acceptable allocation are requested (checked for) in turn and repeatedly until a positive response is received and a requested allocation is available and acquired.

Acquiring the requested licenses may comprise launching a proxy license server for the job, which proxy license server is configured to acquire and hold the available allocation of licenses on behalf of the job. The proxy license server is an entity which can be assigned licenses by a real license server on behalf of a job. The proxy license server is associated with a particular job, hence when the job is being executed the proxy license server is identified and is accessible. Proxy license servers provide a mechanism for organizing licenses of jobs being executed, grouping them according to job, and maintaining the licenses in an accessible location.

In addition to other functionality, the license scheduling module may be configured to check whether an allocation of licenses is available from a real license server and/or from proxy license servers of other jobs currently being executed. For example, it may be that the job information includes an indication of a timing by which the job is to be completed; and if the license scheduling module identifies that the checked allocation of application licenses for the job are available from the proxy license server of another job which is scheduled to complete before the indicated timing, the license scheduling module is configured to reserve the indicated application licenses for the job and to launch a proxy license server for the job to receive the indicated application licenses from the other job upon completion of the other job.

In some implementations, it may be that every time a job is completed the proxy license server for the completed job is shutdown and the licenses returned to the real license servers from which they were acquired (or returned to from wherever they were acquired). Alternatively, it may be that the license scheduling module is configured to match jobs currently being executed with pending jobs so that when the job currently being executed is completed, and its proxy license server shutdown, the application licenses are transferred directly to a proxy license server for the matched pending job. Alternatively or additionally, it may be that upon shutdown of a proxy license server, some application licenses are returned to the real license servers from which they were acquired, and some are transferred directly to another proxy license server. Depending on the implementation, it may be that the license scheduling module is configured to check the real license servers for available application licenses before checking the proxy license servers of jobs currently being executed, since it is likely that acquiring available application licenses from the real license servers will be quicker than waiting for an executing job to complete. The precise matching algorithm will depend on the implementation details. It may be that a proxy license server is sought having an allocation of licenses which is on or within the boundaries set by the optimum allocation and minimum acceptable allocation defined for the pending job, so that the full quota of licenses can be transferred. Alternatively, it may be that the license scheduling module is configured to acquire available licenses from the real license servers as and when they become available even if there are not sufficient application licenses to fulfill the requirements of the pending job, and the missing application licenses are sought from proxy license servers of pending jobs and acquired upon completion.

Furthermore, it may be that the license scheduling module is configured to take account of acceptable timings when matching pending jobs to proxy license servers of jobs currently being executed. The acceptable timing indicated for a pending job can be used by the license scheduling module as a discriminator in searching proxy license servers to match with the pending job. For example, only proxy license servers of jobs due to finish within an acceptable start time of the pending job will be considered as candidates for matching.

Optionally, the job execution scheduler may be configured to notify the license scheduling module upon completion of a job, and the license scheduling module is configured to terminate the proxy license server of the completed job and transfer the application licenses held by the terminated proxy license server to a waiting proxy license server or to the real license server.

A proxy license server is launched for a job and exists as an entity for the lifetime of the job, that is, until completion of the job. A proxy license server may be launched as soon as a job is received at the job information receiving module, or may be launched once application licenses for the job are available as a mechanism for acquiring the available licenses. The proxy license server of a job is shutdown or terminated upon completion of the job for which it was launched.

As an implementation example, the job execution scheduler, and the hardware scheduling module are provided as components of a job scheduler; and the job information receiving module and the license scheduling module are provided as a separate process configured to interact with the job execution scheduler, the hardware scheduling module, and one or more real license servers.

It can be appreciated that many configurations of modules are possible in embodiments of the present invention. A job scheduler may be adapted or modified to await a signal or indication from the license scheduling module that the application licenses required to perform a job have been acquired. The job information receiving module and the license scheduling module are provided as a program or process configured to intercept jobs before they reach the job scheduler, extract or otherwise calculate requirements from the job (wherein a job is represented by job information), pass the calculated requirements and other job information to the job scheduler, and interact with real license servers on behalf of the job, and trigger or flag to the job scheduler when the applications licenses for a job have been acquired and hence the job is ready to be executed (pending availability of computing hardware resources).

Embodiments of an aspect of the present invention include a method of scheduling job execution timings in a computing system; the method comprising: receiving job information defining a job pending execution in the computing system, the job information including an indication of computing hardware resources required to execute the job, and an indication of an allocation of application licenses required to execute the job; and coordinating execution of the job at a timing determined in dependence upon the availability of both the indicated computing hardware resources and the indicated application licenses.

Embodiments of another aspect of the invention include a job scheduling system as defined or described elsewhere in this document, and computing hardware resources configured to execute the scheduled jobs.

Embodiments of another aspect of the invention include a computer program which, when executed by a computing apparatus, causes the computing apparatus to function as the job scheduling apparatus according as defined or described elsewhere in this document.

Embodiments of another aspect of the invention include a computer program which, when executed by a computing apparatus, causes the computing apparatus to perform a method embodying the present invention.

Furthermore, invention embodiments may include a suite of computer programs which, when executed by a distributed network of computing apparatuses, cause the distributed network of computing apparatuses to function as a system embodying the invention.

Furthermore, embodiments of the present invention include a computer program or suite of computer programs, which, when executed by a system of computing apparatuses including a distributed network of storage units cause the system to perform a method embodying the present invention.

Although the aspects (software/methods/apparatuses) are discussed separately, it should be understood that features and consequences thereof discussed in relation to one aspect are equally applicable to the other aspects. Therefore, where a method feature is discussed, it is taken for granted that the apparatus embodiments include a unit or apparatus configured to perform that feature or provide appropriate functionality, and that programs are configured to cause a computing apparatus on which they are being executed to perform said method feature.

BRIEF DESCRIPTION OF THE DRAWINGS

A detailed description of embodiments of the present invention will now be given, purely by way of example, with reference to the accompanying drawings, in which:

FIG. 4 is an exemplary batch job script;

FIG. 9 illustrates the transfer of licenses between entities during scheduling and execution of a job;

DETAILED DESCRIPTION OF THE PREFERRED EMBODIMENTS

Figure 1:
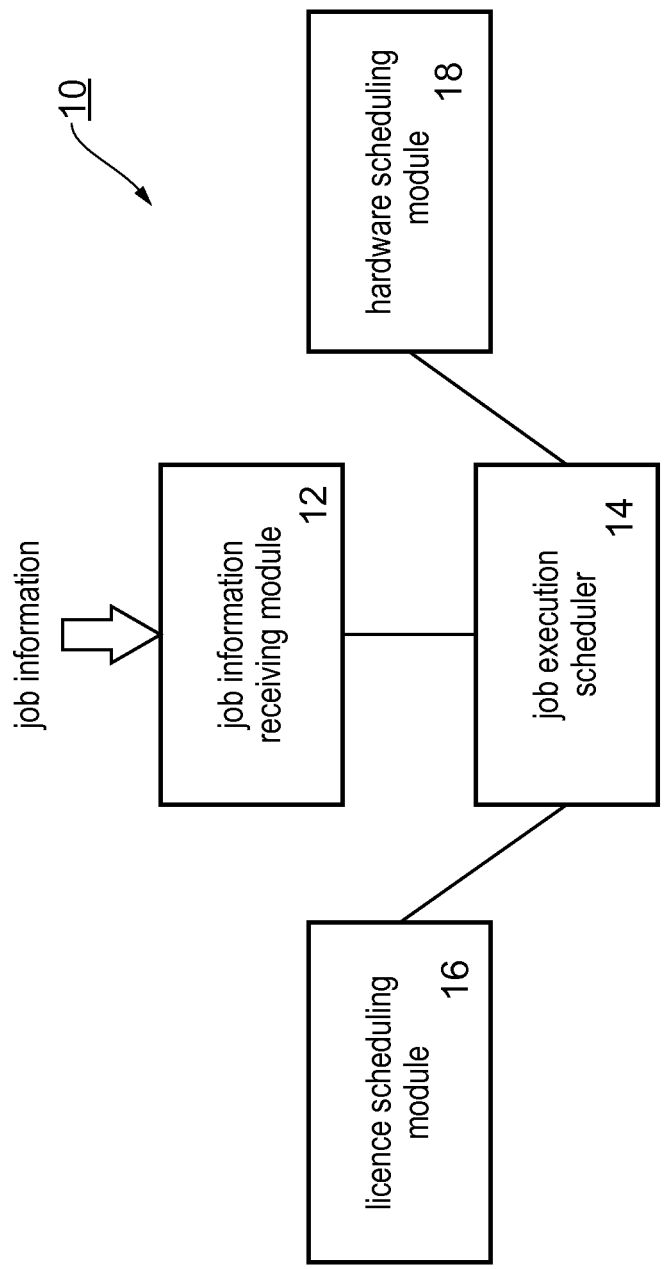
FIG. 1 illustrates a job scheduling apparatus embodying the present invention.

FIG. 1 illustrates a job scheduling apparatus embodying the present invention. The job scheduling apparatus 10 comprises a job information receiving module 12 and a job execution scheduler 14. In addition, the job scheduling apparatus 10 further comprises a license scheduling module 16 and a hardware scheduling module 18. The license scheduling module 16 and hardware scheduling module 18 are optional in embodiments. The job information receiving module 12, job execution scheduler 14, license scheduling module 16, and hardware scheduling module 18, may be collectively referred to as components of the job scheduling apparatus 10.

The job scheduling apparatus 10 may be provided as dedicated hardware, with each component provided as separate dedicated hardware modules. Alternatively, the job scheduling apparatus may be provided as a software function, for example, as a process running on a data centre manager. The components may be considered to be functional modules running as part of a software function and hence the distinction between the components is useful for understanding the function of embodiments but does not necessarily teach or imply that they must be provided separately. It may be that the job information receiving module 12, the job execution scheduler 14, and the hardware scheduling module 18 are provided as part of a job scheduler or a job scheduler process, while the license scheduling module 16 is external to the job scheduler or as a separate process, the license scheduling module 16 coordinating the acquisition of application licenses and assigning them to jobs. Alternatively, the license scheduling module 16 may be provided as part of the same job scheduler or job scheduling process as the remaining components. In a further optional configuration, the job information receiving module 12 and license scheduling module 16 are provided as an integrated program or process, communicating with the job execution scheduler 14, which is provided separately.

The job information receiving module 12 is configured to receive job information defining a job pending execution in the computing system, the job information including an indication of computing hardware resources required to execute the job, and an indication of an allocation of application licenses required to execute the job. The job information may be submitted by a user. Alternatively or additionally, the job information may be based on a request submitted by a user having been received at the computing system separately and been subjected to processing in preparation for submission to the job information receiving module 12 as job information. The job may be a batch job, and the job information may be provided as a batch job script 140.

The job information receiving module may be configured to perform processing on the received job information, for example, to extract certain data or indications from the job information. The job information may be received in units so that one single unit of job information corresponds to one job, for example, one batch job script 140 per job. Alternatively, job information may be provided as data from which the job information receiving module 12 is configured to identify the individual jobs and extract the requirements per job. In terms of requirements, the job information receiving module 12 may be configured to extract from the job information an indication of the computing hardware resources required to execute a particular job and the application licenses required to execute a particular job. An indication may be explicit details of the hardware resources or application licenses, or may be data which allow the explicit details to be sought, for example, from a lookup table. Furthermore, the job information may include an indication of a timing (either absolute or relative to the present time or time of receipt) by which the job is to be completed, or alternatively a timing by which the job is to be started.

The job information receiving module 12 informs the job execution scheduler 14 of the requirements of the job, wherein requirements is a collective term including computing hardware resources, application licenses, and timings where included. The job execution scheduler 14 is configured to schedule execution of the job at a timing determined in dependence upon the availability of both the indicated computing hardware resources and the indicated application licenses.

The job execution scheduler 14 is operable to receive a job, or information describing a job, which is pending execution in the computer system. The job execution scheduler 14 is operable to determine a timing at which each job is to be executed. For example, it may be that the job execution scheduler 14 stores a list of jobs pending execution, and determines when to move a job from the pending list to be run. At the determined timing, it may be that certain job information is submitted to a node responsible for executing the job, or for coordinating execution of the job by submitting inputs arguments to applications and receiving outputs. The job execution scheduler 14 is configured to wait until both the indicated application licenses and the indicated computing hardware resources are available before running a job.

The job execution scheduler 14 may be configured to reserve and acquire hardware resources and application licenses on behalf of a job, and schedule timing of the job at such a time as the hardware resources and application licenses are available. The job execution scheduler 14 may operate in cooperation with a license scheduling module 16 and a hardware scheduling module 18. The hardware scheduling module 18 is configured to reserve the indicated computing hardware resources on behalf of the job. The form of that reservation depends on the computing system within which the embodiment is implemented. For example, it may be that once the job execution scheduler receives job information of a pending job, the hardware scheduling module 18 is informed of the computing hardware resource requirements indicated in the job information, and is configured to communicate with computing hardware resources directly, or with operating systems or computing resource controllers, to determine if and/or when the indicated computing hardware resources are available. It may be that if they are available immediately, the hardware scheduling module 18 effectively holds the available resources on behalf of the job, so that the resources are not available to other applications or jobs. Alternatively, it may be the hardware scheduling module 18 is configured to enter into queuing arrangements to wait for the required hardware resources and to secure (that is, acquire and hold) them on behalf of the job when they become available.

The license scheduling module 16 is configured to check for availability of the indicated application licenses on behalf of the job, and optionally to acquire or reserve the licenses on behalf of the job. Checking for availability of application licenses facilitates the functionality of the job execution scheduler 14. The license scheduling module 16 may also be operable to reserve and/or acquire application licenses on behalf of a job. For example, it may be that once the job execution scheduler 14 receives job information of a pending job, the license scheduling module 16 is informed of the application license requirements indicated in the job information, and is configured to communicate with real license servers, or with some other form of application license controller, to determine if and/or when the indicated application licenses are available. It may be that if they are available immediately, the license scheduling module 16 effectively holds the available application licenses on behalf of the job, so that the held application licenses are not available to other applications or jobs. Alternatively, it may be the license scheduling module 16 is configured to enter into queuing arrangements to wait for the required application licenses and to secure (that is, acquire and hold) them on behalf of the job when they become available.

The hardware scheduling module 18 and the license scheduling module 16 are configured to cooperate with the job execution scheduler 14 in scheduling execution of pending jobs. For example, the hardware scheduling module 18 may be configured to notify the job execution scheduler 14 when the indicated hardware resources have been reserved and are ready and waiting for the job to be executed. Similarly, the license scheduling module 16 may be configured to notify the job execution scheduler 14 when the indicated application licenses have been acquired on behalf of the job and are ready to be utilized in executing the job.

Figure 2:
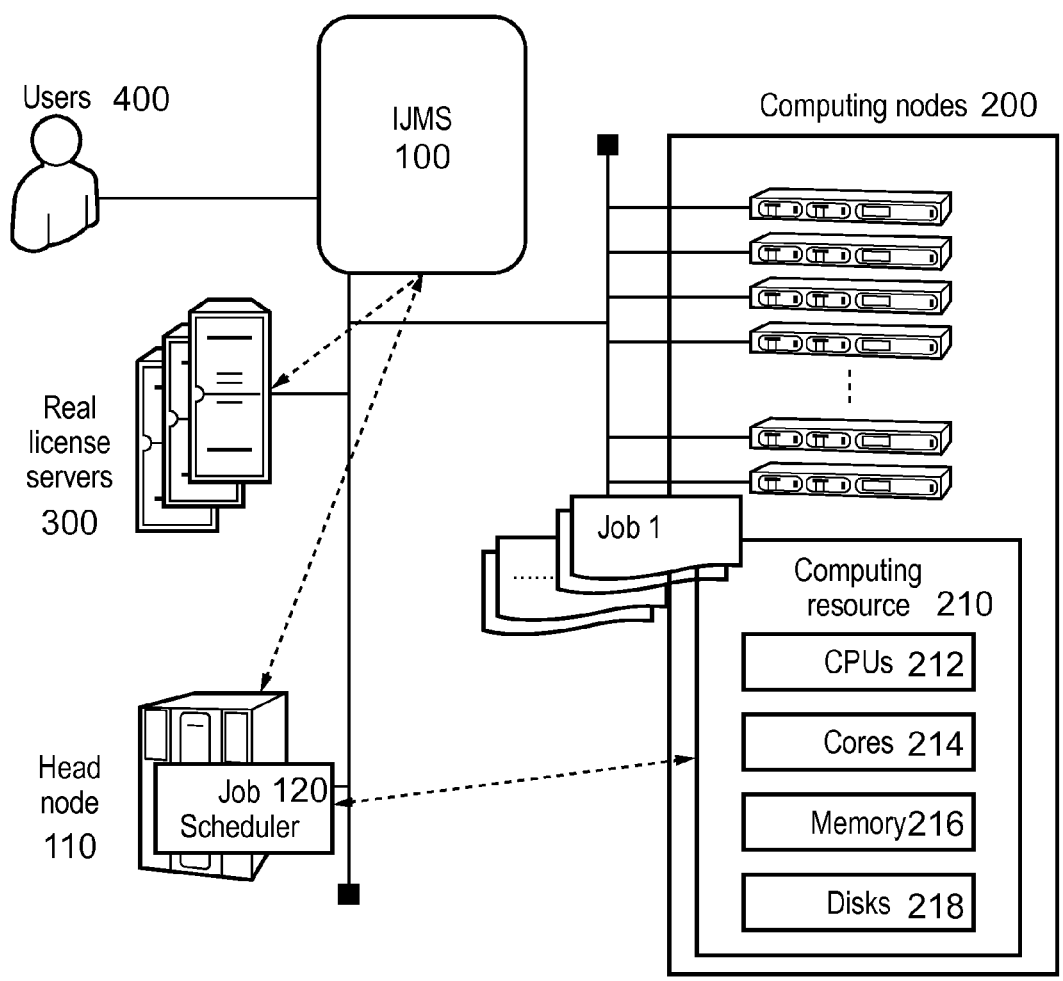
FIG. 2 illustrates an exemplary architecture of a job scheduling system embodying the present invention in its context of a computing system.

FIG. 2 illustrates an exemplary architecture of a job scheduling system embodying the present invention in its context of a computing system. The integrated job management system (IJMS) 100 is exemplary of the job information receiving module 12 and license scheduling module 16 mentioned elsewhere in this document. The job scheduler 120 is exemplary of the job execution scheduler 14 and the hardware scheduling module 18. The job scheduler 120 is hosted on a head node 110. The head node 110 is a computing apparatus which is connectable to the computing system on which the jobs are executed. The head node 110 may have other management functions in addition to running the job scheduler 120. Optionally, the IJMS 100 may also be hosted on the head node 110, that is to say, the job scheduler 120 and the IJMS 100 may be hosted on the same computer. Communication between the head node 110 and the real license servers 300 is via the IJMS 100. Similarly, communication between the job scheduler 120 and the real license servers 300 is via the IJMS 100. The users 400 are illustrated as an exemplary source of jobs to be executed on the computing nodes 200. The jobs are submitted by the users to the computing nodes 200 and received by the IJMS 100. Submitting a job may comprise sending job information defining the job to be executed to the IJMS 100. The computing nodes 200 are exemplary of the computing system mentioned elsewhere in this document. The computing nodes 200 are an interconnected set of computing apparatuses which provide computing infrastructure that is assignable to a job for the duration of the job, and then becomes available for reassignment. The computing nodes 200 comprise computing resources 210 which are specifically assignable to jobs. Computing resources 210 are exemplary of the computing hardware resources mentioned elsewhere in this document and include CPUs 212, cores 214, memory 216, and disks (storage space) 218. The real license servers 300 are entities responsible for controlling the allocation of application licenses to computing processes in the computing nodes 200. It may be that a finite number of concurrent licenses are held by the real license servers 300 so that there is an upper limit to the number of simultaneous incarnations of an application that can be run in the computing nodes 200 at any one time. The real license servers 300 are responsible for assigning licenses to run applications to jobs (computing processes), tracking those assignments, and making licenses available again following completion of a process using assigned licenses.

A job information receiving module 12 is configured to receive job information from a user 400. The job information receiving module may be provided as a function of the job scheduler 120, the IJMS 100, or as a separate function of the head node 110. The job information receiving module 12 is configured to extract at least computing hardware resource requirements and application license requirements from the received job information. The job information receiving module 12 informs the job scheduler 120 of the computing hardware resource requirements and the job scheduler 120 (or specifically the hardware scheduling module 18) is configured to cooperate with the computing resources 210 to reserve the required computing hardware resources on behalf of the job. The IJMS 100 itself (or, more specifically, the license scheduling module 16) is configured to communicate with the real license servers 300 to check for availability of the required application licenses on behalf of the job, and to reserve or acquire the required application licenses when they become available. The IJMS 100 communicates with the job scheduler 120 to notify the job scheduler 120 when the required application licenses have been acquired, or to notify the job scheduler 120 of a timing for which the required application licenses have been reserved. The job scheduler 120 is then configured to schedule execution of the job at a timing when both the required computing hardware resources and required application licenses are available. At such a timing, the job scheduler 120 submits the job to the computing nodes 200 for performance by the required computing hardware resources using the required application licenses.

Figure 3:
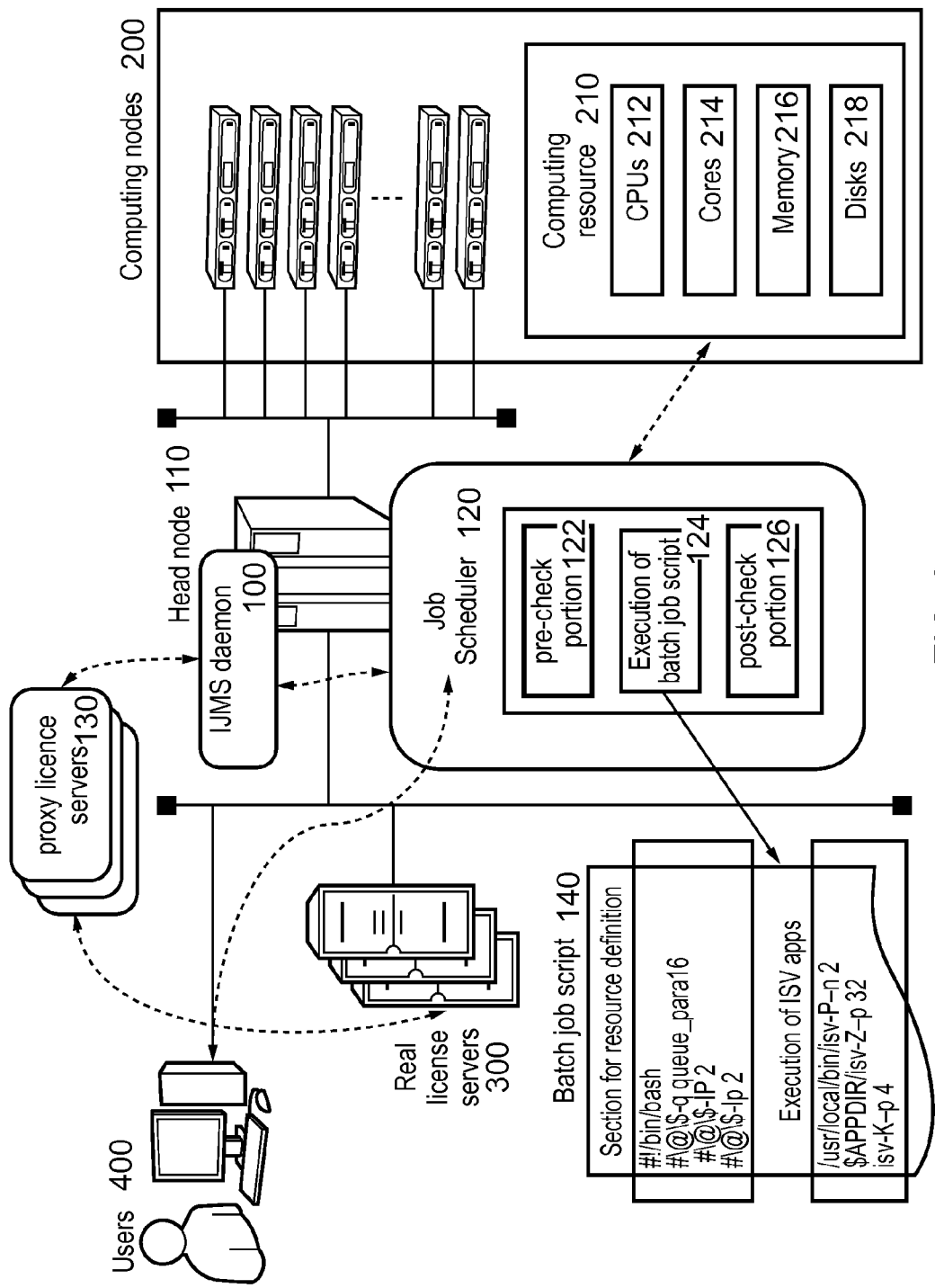
FIG. 3 illustrates the exemplary architecture of FIG. 2, with the job scheduler 120 and IJMS 100 illustrated in more detail.

FIG. 3 illustrates the exemplary architecture of FIG. 2, with the job scheduler 120 and IJMS 100 illustrated in more detail. A particular example of the IJMS 100 is illustrated in which the IJMS 100 operates as a daemon, that is to say, a process which is transparent to the user and does not require user input to function. In this particular example, the IJMS daemon 100 is configured to launch proxy license servers 130, one per job, in order to hold the required licenses on behalf of the job. The proxy license servers 130 may also be configured to communicate with the real license servers 300 in order to check for availability of, reserve, and/or acquire licenses on behalf of the job. The job scheduler 120 includes three functional portions or modules, which exemplify the functionality that may be provided by such a job scheduler 120. The job scheduler 120 comprises a pre-check portion 122, a batch job script execution portion 124, and a post-check portion 126. The IJMS daemon 100 and the job scheduler 120 are processes running on a head node 110.

The dotted lines in FIG. 3 represent the principle interactions between process or components. The hard lines represent interconnections, and it can be seen that the head node 110 acts as an access point by which users 400 can access the infrastructure and applications of the computing nodes 200. The IJMS daemon 100 via the proxy license servers 130 provides a mechanism to reserve and acquire application licenses from the real license servers 300 on behalf of a job. The job scheduler 120 is responsible for reserving computing resources 210 on behalf of the job and coordinating execution of the job at a timing when the required application licenses have been acquired and the required computing resources are available.

A user 400 submits a job to the computing nodes 200 for execution. The job is represented by job information, which is received by a head node 110, the head node 110 being an access point between users and the computing nodes 200. A job information receiving module 12 at the head node 110 is configured to receive the job information and perform processing to extract information required for scheduling the job. The job information receiving module 12 may be functionality provided by the job scheduler 120, the IJMS daemon 100, or as a separate process running on the head node 110. The submitted job information includes an indication of the computing hardware resources required to perform the job, and an indication of the application licenses required to perform the job. The indication is not necessarily an explicit recital of the requirements, but is sufficient for the job information receiving module 12 to extract the requirements, for example, with the aid of a lookup table.

The IJMS 100 is functionality that may be realized by a daemon process running on the head node 110. The IJMS 100 of FIG. 3 is configured to couple with a job scheduler 120 and multiple real license servers 300, possible via proxy license servers 130. The IJMS 100 may use proxy license servers 130 as a mechanism for communicating with the real license servers 300. The IJMS 100 is exemplary of the license scheduling module 16 mentioned elsewhere in this document, and optionally also provides the functionality of the job information receiving module 12. Thus, the IJMS 100 provides a mechanism by which to establish availability of licenses on behalf of the job scheduler 120, and to acquire the licenses and hence enable the job scheduler 120 to delay submitting the job to the computing nodes 200 for execution until the required application licenses have been acquired. After a job is submitted by a user 400 and the job information receiving module 12 has informed the IJMS 100 of the application license requirements, the IJMS 100 is configured to launch a proxy license server 130 per job to set about acquiring the required application licenses before the job is executed.

In the exemplary system of FIG. 3, the job scheduler 120 includes a pre-check portion 122 which is configured to store a list of pending jobs, and to control the statuses of the pending jobs according to the availability of the indicated required application licenses and computing hardware resources. Jobs are held in the list with a "pending" or "wait" status until both the indicated computing hardware resources are available and the indicated application licenses have been acquired, at which point the status can be changed to "running" or "run", and the job submitted for execution by the batch job execution module 124.

Once a job has had its status changed to "running", or "run", and it has been forwarded to the batch job execution module 124, the batch job execution module 124 is configured to coordinate execution of the job on the portion of the computing resources 210 reserved for the job.

Once the job is finished, the job information, or some other data representing the job, is forwarded to the post-execution portion 126 of the job scheduler 120, and the application licenses held by the corresponding proxy license server are released.

The job information submitted by the user may be in the form of a batch job script 140. Alternatively, the head node may provide an interface by which a user can select options and a batch job script 140 reflecting those options is automatically composed. The batch job script 140 is exemplary of the job information mentioned elsewhere in this document. The batch job script 140 may implement the format required by the job scheduler 120 of the computing system on which the job is to be performed. For example, the local scheduler options may enable a user to specify required resources such as computing nodes, CPUs, cores, and memory size. The batch job script 140 may also include the command lines which cause execution of applications. For example, the applications may be ISV applications.

An exemplary batch job script 140 is illustrated in FIG. 4. The exemplary batch job script 140 comprises three sections: resource definition 142, environment settings 144, and ISV apps execution 146. The resource definition section 142 includes an indication of the computing resources a job requires to run. The grammar composition of the resource definition depends on the implementation, and may vary between job schedulers. The absence of any explicit resource definition can also be taken as an indication of computing hardware resources, insofar as the job scheduler may be configured with a default computing hardware resource configuration to allocate to jobs. The environment settings section 144 specifies environment variables such as execution commands and mathematical libraries' paths. The job scheduler is thus able to change the execution directory of a job to an appropriate location. The ISV apps execution section 146 defines the applications required to execute in performing the job, and includes an indication of the licenses required per application in order to complete the job. Application licenses are held by real license servers.

A real license server, which may also be referred to as a license server, manages the licenses of ISV applications in a computing system. It is often the case that multiple license servers are running within a single system. For example, some redundancy may be provided, or there may be one license server per application. A license server may be a virtual server, so that more than one license server can run on a single computing node. It is also the case that a real license server may be provided as a virtual server. The real prefix denotes that the real license server is the entity responsible for controlling access to the application.

In prior art systems, using the example of the exemplary batch job script 140 of FIG. 4, line 14 (#Line 014), line 14 is the execution command to run the ISV application whose name is indicated by 'isv-P'. When the job is executed and the batch script tries to run 'isv-P', the script directly enquires as to the availability of the required application licenses with the license server specified in an ISV application's configuration file. If the required number of licenses is available, the ISV application starts to run with the specified conditions. However, if the required number of licenses is not available, the ISV application exits due to the lack of license. Hence, the job is not completed.

IJMS 100 provides functionality to check for the availability of and acquire the licenses of ISV applications before a batch job is executed, that is to say, before a batch job goes to 'RUN' status on a job scheduler 120. The IJMS 100 informs the job scheduler 120 when the required application licenses have been acquired. The other prerequisite for a job to be executed is the reservation of the required computing hardware resources. The license acquisition before the job execution is accomplished by the IJMS daemon 100 launching a proxy license server 130 per job, which is configured to communicate with real license servers 300 on behalf of the batch script defining the job.

In addition to the ability to check for the availability of and acquire licenses, the IJMS 100 may also be configured to assign licenses to a job in advance of the licenses being released by a currently-executing job. For example, if there are jobs being executed for which application licenses are being used, and which will complete within a specified amount of time, other jobs which are waiting for application licenses may be linked to the currently-executing job so that they are assigned the application licenses by the proxy server of the currently-executing job directly upon completion of the job. Further functionality which the IJMS may provide includes checking for the availability of and acquiring not just a specified number of licenses per application, but a range of license allocations on behalf of a job, in order to provide flexibility in the case of a specified number of licenses per application not being available.

The IJMS 100 provides the functionality of managing the acquisition and assignment of application licenses on behalf of the job scheduler 120. The IJMS 100 may be provided by an IJMS daemon 100 running on a server, for example, the server may be the head node 110 of a computing system.

Figure 5:
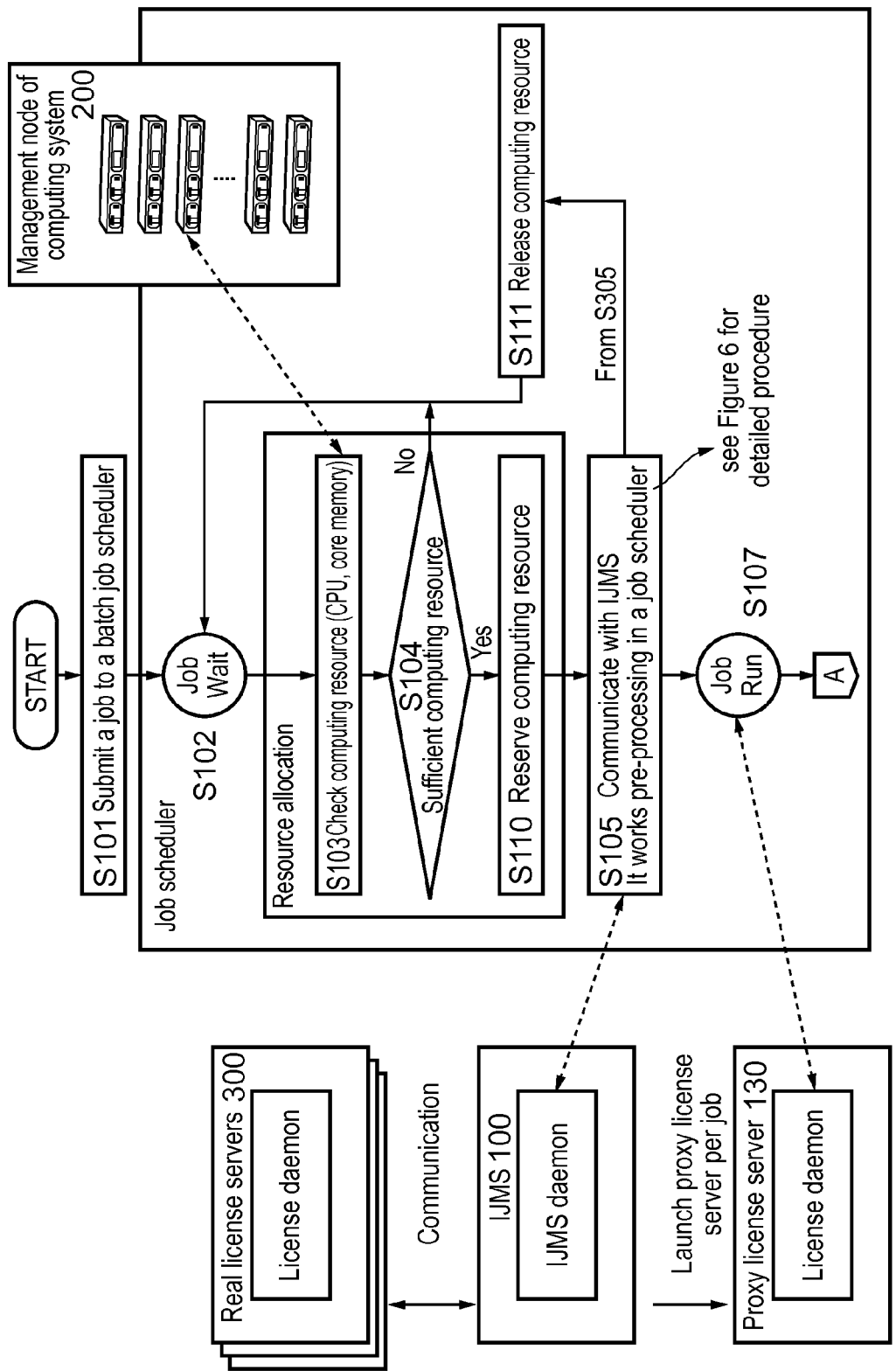
FIG. 5 illustrates an exemplary application license management process embodying the present invention.

FIG. 5 illustrates an exemplary application license management process embodying the present invention. At step S101 a job is submitted to a computing system by a user 400 and the batch job script 140 is received by the job scheduler 120. At step S102 the job scheduler 120 stores the batch job script 140 and sets a status of the job as "wait", indicating that the job is not yet ready to be executed. At steps S103 to S104, the job scheduler 120, possibly via a hardware scheduling module 18, is configured to periodically check with a management node of the computing nodes 200 whether computing hardware resources indicated as requirements for executing the job in the batch job script 140 are available. The status of the job remains as "wait". Once the required computing hardware resources are available, the flow proceeds to step S110 and the job scheduler 120 is configured to reserve the required computing hardware resources on behalf of the job. The flow proceeds to step S105, at which the job scheduler 120 communicates with the IJMS 100 to establish when the required application licenses are available. The IJMS 100 is configured to communicate with the real license servers 300 to check for availability of the required application licenses and, when the required application licenses are available, to launch a proxy license server 130 specifically for the job to acquire the licenses. For example, license access APIs may be used to check for availability of licenses at real license servers 300. The job scheduler 120 is informed that the required application licenses have been acquired and at step S107 the job scheduler executes the job in accordance with the batch job script 140 using the reserved computing hardware resources and the acquired application licenses. If the licenses cannot be acquired at step S105 (for example, if a predetermined or specified amount of time has passed and the required application licenses have not been successfully acquired), the flow proceeds to S111, the reserved computing hardware resources are released, and the job status returns to "wait". This may have the effect of returning the job to the back of a queue in the job scheduler 120 because it will have been in the "wait" status for a shorter period of time than other stored job batch scripts.

Figure 6:
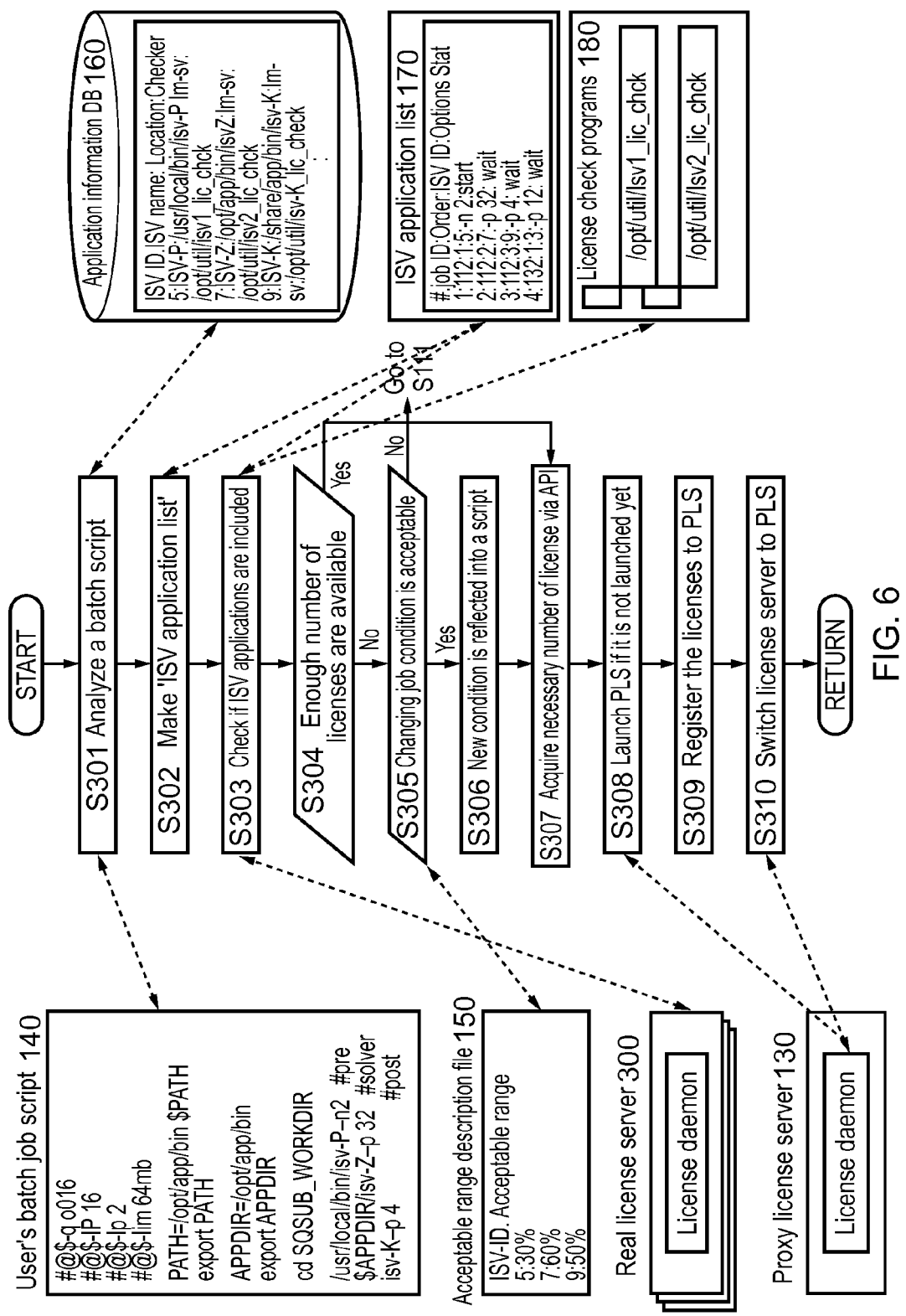
FIG. 6 illustrates exemplary processing at the license scheduling module.

FIG. 6 illustrates the process of step S105 in more detail. In this particular example, a copy of the batch script, or a portion thereof, is transmitted from the job scheduler 120 to the IJMS 100. The IJMS 100 is configured to analyze the information received from the job scheduler 120 at steps S301-S303 to determine whether the batch job script 140 requires the execution of applications requiring licenses (also referred to simply as "applications" or "ISV applications"). The IJMS 100 may make reference to an application information database 160. The application information database 160 links an application ID, which may be specified in a batch job script 140, to related application information including some or all of a particular program name, command path, license server ID, and license check program path. An exemplary table from an application information DB 160 is presented below in table 1.

TABLE 1

Application information database

| ISV application ID | Command Path | Program Name | License Server | License Check Program |
|---|---|---|---|---|
| 5 | /usr/local/bin | isv-P | lm-sv1 | /opt/util/isv1_lic_chck |
| 7 | /opt/app/bin | isv-Z | lm-sv1 | /opt/util/isv2_lic_chck |
| 9 | /usr/local/bin | isv-K | lm-sv2 | /opt/util/isv3_lic_chck |
| ⋮ | | | | |
| 23 | /app/group1/bin | FJapp10 | lm-sv2 | /app/util/check_FJapp10 |
| 16 | /opt/fluid/bin | FJapp20 | lm-sv5 | /app/util/check_FJapp20 |

Column 1 stores ISV application ID.

Column 2 stores the command path of application programs (execution modules).

Column 3 stores the names of executables.

Column 4 stores the real license servers' name or some other form of identification of real license server.

Column 5 stores the location of the license check programs.

If it is determined at steps S301-S303 that the batch job script 140 does not require any application licenses, then the IJMS 100 informs the job scheduler 120, specifically the pre-check portion 122, that no licenses are required. The job scheduler 120 has by this point already reserved the required computing hardware resources (see step S104), so the job is performed by the computing nodes 200 using the reserved computing hardware resources. If, at steps S301-S303, it is determined that the batch job does include execution of applications requiring licenses, then the IJMS 100 compiles a table of relevant application information in the form of an application list. Table 2 represents an exemplary application list 170. The precise form of the application list 170 will vary depending on implementation. In some implementations, the batch job script 140 itself may contain an application list 170 such as that of Table 2. At step S302, a list of applications is composed. At step S303 it is checked whether the batch job script includes application execution requiring application licenses.

TABLE 2

ISV application list

| Index | Job ID | Order | ISV application ID | Execution Options | Execution Status |
|---|---|---|---|---|---|
| 1 | 112 | 1 | 5 | −n 2 | start |
| 2 | 112 | 2 | 7 | −p 32 | wait |
| 3 | 112 | 3 | 9 | −p 4 | wait |
| 4 | 132 | 1 | 3 | −p 22 | wait |

Column 1 stores simply an index to distinguish between rows.

Column 2 stores the ID of the job as issued to the job by the job scheduler 120 or the job information receiving module 12. The ISV application list may be global for all pending jobs, so that it is updated each time a job is received at the IJMS 100 or the execution status of a job changes, or it may be that there is an ISV application list created and maintained per job.

Column 3 stores the execution order of applications in a batch job script.

Column 4 stores the application ID.

Column 5 stores any relevant execution options, which may be extracted from the batch job script.

Column 6 stores the execution status, and may be updated by the IJMS 100 as the execution status changes.

Using the application list 170, in conjunction with relevant information from the application information database 160 such as location of license check programs, at step S304 the IJMS 100 communicates with the real license servers 300 of the applications in the application list 170 and tries to acquire the required number of licenses per application, for example by using license access APIs. The required number of licenses per application may be given in the batch job script 140 and stored in the application list 170. Alternatively, a license check program is accessible per application, which calculates the required number of licenses in the same logic and checks if the required number of licenses is available or not by asking the license server via license access APIs. If the required number of licenses per application is available, the flow proceeds to step S307, and the IJMS 100 acquires the licenses via an API. The flow proceeds to step S308 at which the IJMS 100 launches a proxy license server 130 for the job to hold and manage the required licenses from the respective real license server(s) 300. Alternatively, the proxy license server 130 may be launched before the licenses are acquired and the proxy license server 130 is configured to acquire the licenses from the real license servers 300. At step S309 the acquired licenses are registered to the proxy license server 130. At step S310, the job scheduler 120 is informed and the destination license server for the job is switched to the proxy license server 130, for example, by switching a port number.

The batch job script 140 may include an acceptable range description file 150, so that if the number of licenses per application for which availability is checked are not available, then at step S305 the IJMS 100 can check whether any allocation of licenses within the acceptable range is available. If the first number of license per application for which availability is checked are not available, but an allocation of licenses within the acceptable range is available, then the flow proceeds to S306 and the batch job script 140 is updated to reflect the available allocation, and at step S307 the available allocation is acquired. If no allocation of licenses within the acceptable range is available, that is to say, if the minimum acceptable allocation of licenses is not available, or if there is no flexibility in the number of licenses required, then at step S305 the answer is 'no', and the flow returns to step S111 of FIG. 5.

Table 3 below shows the data that might be included in an acceptable range description file 150.

TABLE 3

| ISV-ID: | Acceptable range |
|---|---|
| 5: | 30% |
| 7: | 60% |
| 9: | 50% |

In the example given above, the acceptable range description file 150 defines an acceptable range (how far below the specified required number) of licenses for one or more applications. The acceptable range description file 150 may be stored in a directory particular to that user for use whenever that user submits a job, alternatively, the acceptable range description file 150 may be provided as information in the batch job script 140. The IJMS 100 is configured to obtain the maximum number of licenses per application between the number of licenses indicated in the batch job script 140 as required, and the minimum number derivable from the number indicate din the batch job script 140 and the acceptable range. If the minimum number of licenses of each application required by the job is not available, then the flow returns to step S111 and the computing resources are returned. In some implementations, the batch job script 140 may specify, or provide information from which the IJMS 100 can calculate or derive, an acceptable time within which the licenses can be acquired before releasing the computing resources. It may be that the IJMS 100 is configured to monitor the availability of application licenses for the duration of the acceptable time, and if an allocation licenses meeting the minimum acceptable allocation becomes available, then the IJMS 100 launches a proxy license server 130 to acquire the licenses. An allocation of licenses is a number of licenses per application for one or more applications.

Once either the required licenses have been acquired, or an acceptable allocation of licenses have been acquired, the licenses are registered to the proxy license server for the job S309, and the license server for the job is switched to the proxy license server S310. The proxy license server provides a means to hold application licenses while the job is in a wait status, so the necessary licenses are held by the proxy license server rather than the real license server. The flow proceeds to step S107, at which the job is run using the reserved computing hardware resources and the acquired application licenses. The status of the job is moved to "run", and the job is executed according to the batch job script 140. Because the proxy license server 130 already holds the licenses on behalf of the job, and the proxy license server 130 serves that particular job only, there is no risk of the job being executed without the necessary application licenses. Therefore, a situation where a user is notified that a job has been terminated, but no or an incomplete output file is received due to applications not being accessed, is avoided.

Figure 7:
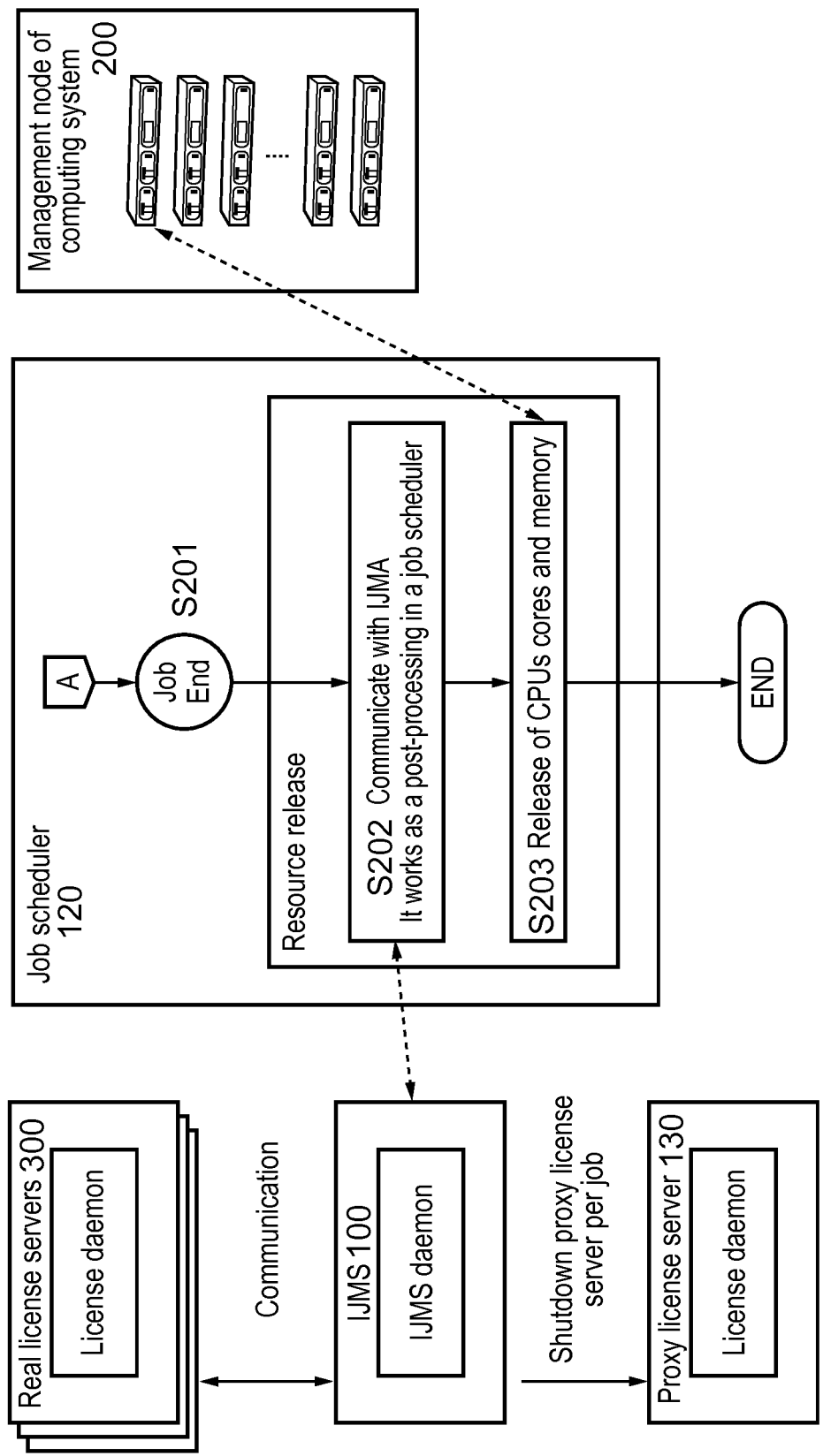
FIG. 7 illustrates a post-processing procedure to be performed after a job has finished executing.

FIG. 7 illustrates the procedure after the job has been executed. At step S201 the job ends. This means that the processing defined in the job information has been completed, the outputs have been generated and stored for access by the user or transferred to the user. During post-processing, it may be that the status of the job is moved to "PEND" in the job scheduler 120. The job scheduler 120 communicates with the IJMS 100 at step S202 to notify the IJMS 100 of the completion of the job. The IJMS 100 is configured to terminate the proxy license server 130 corresponding to the completed job, and to return the licenses either to the real license server 300, or to another proxy license server awaiting the licenses, or to a combination of those two destinations. The flow then proceeds to step S203, at which the job scheduler 120 communicates with the management node of the computing system 200 to release the computing hardware resources reserved for the job.

Figure 8:
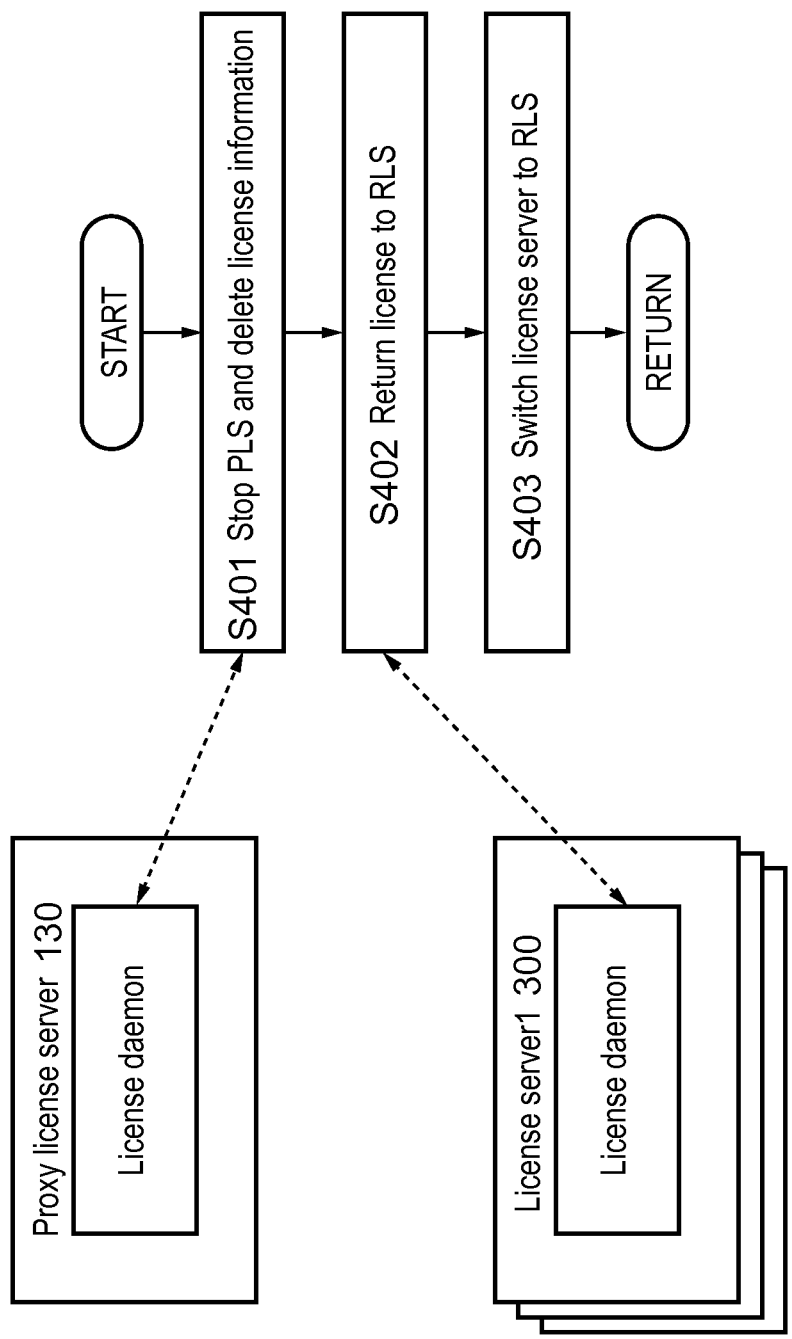
FIG. 8 illustrates processing at an IJMS following completion of a job.

FIG. 8 illustrates in more detail the procedure at the IJMS 100 when it is informed by the job scheduler 120 at S202 that a job has been completed. At S401 the proxy license server 130 for the job is terminated or shutdown and the license information stored thereon deleted. The flow proceeds to S402 at which the licenses are either returned to the respective real license servers 300, or passed on to waiting proxy license servers 130 for other jobs. The target license server is returned to RLS.

FIG. 9 shows the number of available licenses and their location in a situation in which the total number of licenses held by the real license server 300 for application A is 100, and a user 400 submits a job which requires 20 licenses for application A. At step S01 the required number of licenses is calculated. This does not cause any change in the licenses held by the real license server 300. The proxy license server 130 has not yet been launched. At step S02 the IJMS 100 establishes that the licenses are available and acquires 20 licenses. At step S03 the proxy license server 130 is launched and the IJMS 100 transfers the 20 licenses to the proxy license server 130. At step S04 the batch job is started, but application A has not yet been called by the job. At step S05, application A is executed with 20 licenses, so the licenses are consumed. At step S06 application A has finished and the proxy license server 130 once again holds the licenses. At step S07 the batch job finishes, and at step S08 the IJMS 100 terminates the proxy license server 130. At step S09 the proxy license server 130 returns the 20 licenses to the real license server 300.

Figure 10:
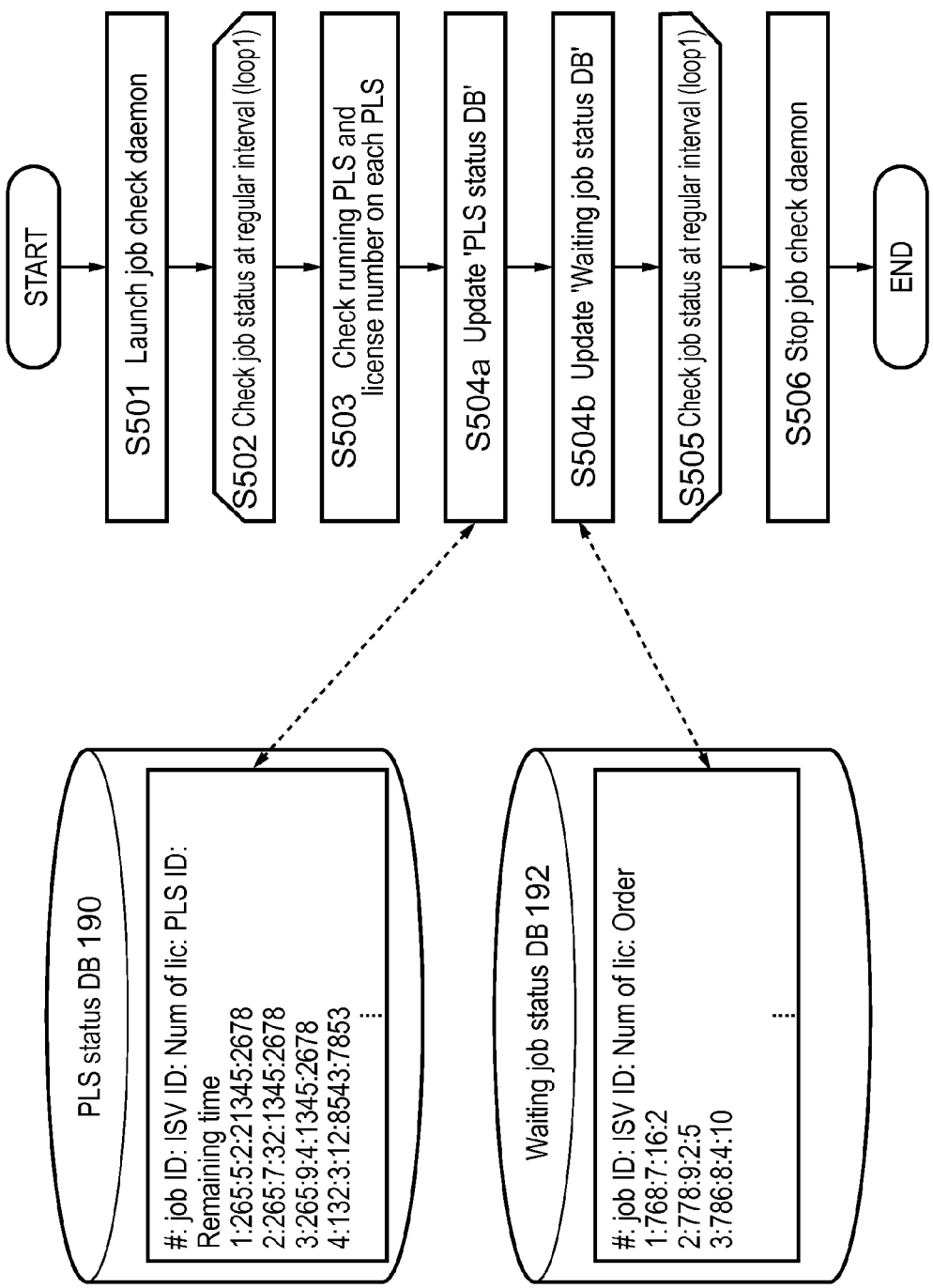
FIGS. 10 and 11 illustrate an exemplary procedure for transferring licenses between jobs.
Figure 11:
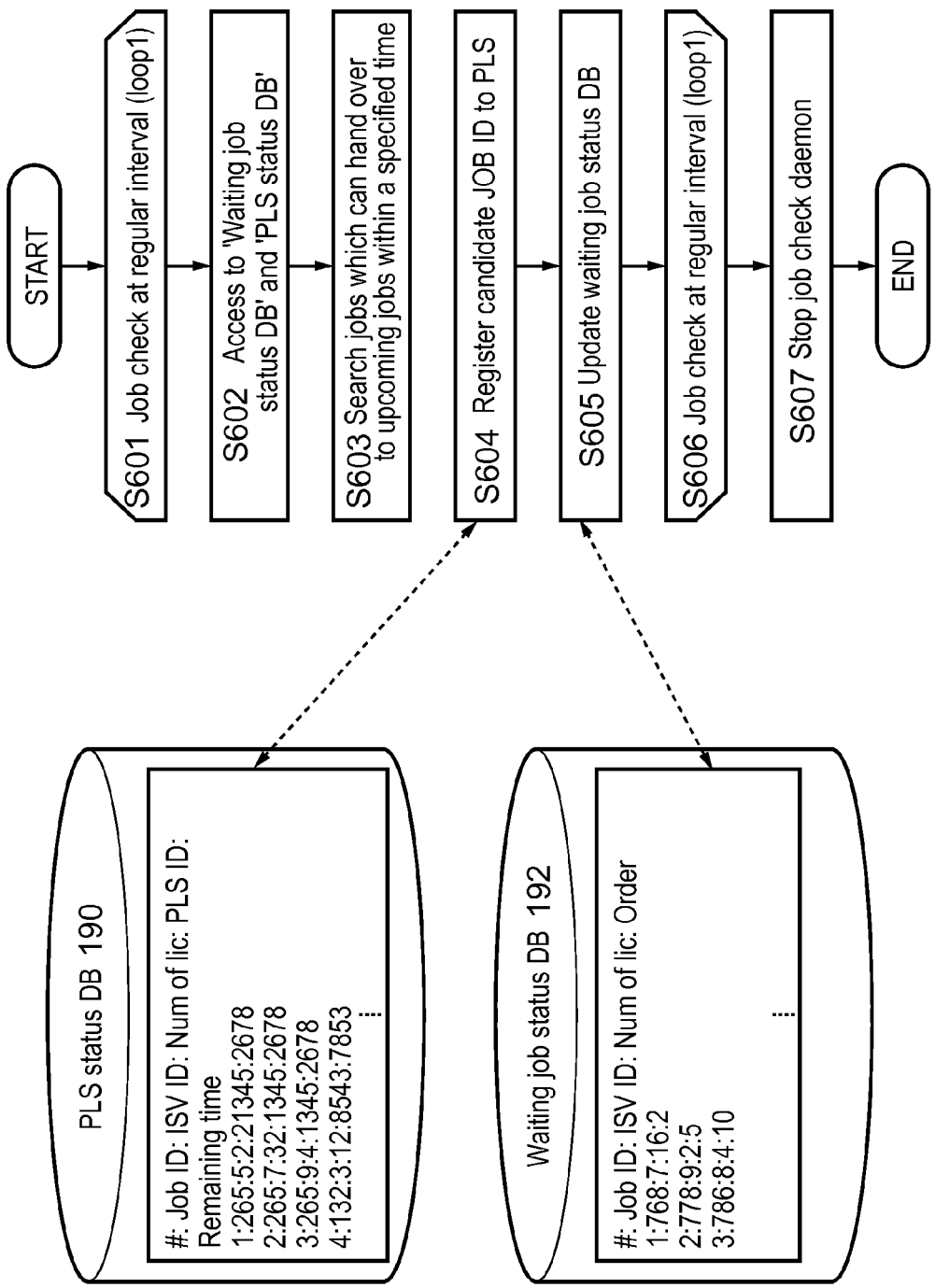

As an aid to utilization of licenses, the IJMS 100 may provide a function of assigning application licenses currently being used by a job being executed to a job awaiting execution. FIGS. 10 and 11 illustrate an exemplary procedure for assigning application licenses to pending jobs. The IJMS 100 is configured to monitor the status of existing proxy license servers 130, and the status of waiting jobs, and periodically update the information.

A process such as a daemon may be used by the IJMS 100 to check the status of jobs to determine whether the licenses of a job currently being executed can be assigned to a job awaiting execution. At step S501 the job check daemon is launched. Steps S502 to S505 define a loop which may be repeated periodically. At step S503 the running proxy license servers 130 are identified, and at step S504a a PLS status DB 190 is updated with information regarding those running proxy license servers, and at S504b the list of waiting job statuses is updated. Table 4 illustrates the information which may be recorded in the PLS status DB 190. In particular, it can be seen that the remaining time and the number of licenses for an identified application is recorded, so that the PLS status DB 190 stores information regarding which application licenses will become available and when.

TABLE 4

| Index | Job ID | ISV ID | Number of licenses | Proxy license server ID | Remaining time |
|---|---|---|---|---|---|
| 1 | 265 | 5 | 2 | 1345 | 2678 |
| 2 | 265 | 7 | 32 | 1345 | 2678 |
| 3 | 265 | 9 | 4 | 1345 | 2678 |
| 4 | 132 | 3 | 12 | 8543 | 7853 |
| : | | | | | |

Column 1 stores an index.
Column 2 stores the Job ID issued to the job by a job scheduler.
Column 3 stores the ID of the application.
Column 4 stores the number of licenses for the identified application held on behalf of the job.
Column 5 stores the PLS ID. This is the same as process number of a PLS.
Column 6 stores an indication of the remaining time of the job (i.e. a projected amount of time from the current time that the PLS will be terminated and the held application licenses become available for other jobs.

The PLS status DB 190 stores information regarding the licenses held by proxy license servers currently running in the computing system, the application licenses which they each hold, and projected termination times. When performing application license assignment from jobs being executed to jobs awaiting execution, the IJMS 100 is configured to refer to the information stored in the PLS status DB 190. In addition, the IJMS 100 is configured to find a job waiting execution to which to assign the application licenses being held on behalf of a currently-executing job. For example, the job scheduler 120 or IJMS 100 may maintain a waiting job status database 192. Table 5 exemplifies the information that may be held in a waiting job status database. In particular, it can be seen that the waiting job status database 192 stores information identifying the application license requirements of a job awaiting execution which cannot be satisfied by the currently available licenses, and an indication of the priority of the job in relation to other jobs, indicated by "order".

TABLE 5

| Index | Job ID | ISV ID | Number of licenses | Order |
|---|---|---|---|---|
| 1 | 768 | 7 | 16 | 2 |
| 2 | 778 | 9 | 2 | 5 |
| 3 | 786 | 8 | 4 | 10 |
| : | | | | |

Column 1 stores an index.
Column 2 stores the Job ID issued to the job by a job scheduler.
Column 3 stores the ID of the application.
Column 4 stores the number of licenses for the identified application held on behalf of the job.
Column 5 stores the execution order, wherein a lower number indicates that the job has been waiting longer and thus is moving forward in a queue.

FIG. 11 illustrates the overall process of assigning application licenses of a currently-executing job to a job awaiting execution. At step S601, the information check and update procedure of steps S501-S505 is performed. At step S602 to S603, the IJMS 100 periodically accesses the PLS status DB 190 and the waiting job status DB 192 to search currently-executing jobs (target jobs) which can handover licenses to jobs awaiting execution (candidate jobs). A first discriminator in a search may be that the target job is projected to complete before the candidate job needs to begin executing. If a candidate job is found to receive licenses from the proxy license server 130 of a target job upon completion of the target job, then the IJMS 100 is configured to register the candidate job to the proxy license server. For example, registration may merely include flagging or otherwise informing the proxy license server 130 to transfer the licenses to a proxy license server at termination rather than to return them to the real license servers, and possibly also an identification of the candidate proxy license server. Otherwise, it may be that the IJMS 100 maintains a list of matches between target jobs and candidate jobs, so that when the proxy license server 130 of the target job terminates, and it has been flagged to transfer the licenses to another proxy license server, it can consult the IJMS 100 to identify the proxy license server 130 to which the licenses are to be transferred.

At step S605 the waiting job status DB 192 is updated to indicate the licenses that the job has been assigned, or to reflect that the assigned licenses are no longer sought on behalf of the job. At step S606 the information check and update of steps S501 to S505 is repeated. The job check may be ongoing on a periodic basis, or may complete after a system trigger such as a shutdown or reset, or after a finite number of loops.

What is claimed:

1. A job scheduling system configured to schedule job execution timings for a job in a computing system, the job scheduling system comprising:
    a processor;
    a job information receiving module configured to receive job information defining a job pending execution in the computing system, the job information including an indication of computing hardware resources required to execute the job, and an indication of an allocation of application licenses required to execute the job comprising an indication of an optimum allocation of the application licenses with which the job can be executed;
    a hardware scheduling module configured to reserve the computing hardware resources on behalf of the job;
    a license scheduling module configured to calculate a minimum acceptable allocation of the application licenses with which the job can be executed based on the indicated optimum allocation of the application licenses, and to check for availability of the application licenses on behalf of the job by checking whether the indicated optimum allocation of the application licenses is available, and if not, checking whether an allocation of the application licenses less than the optimum allocation and more than or equal to the minimum acceptable allocation of the application licenses is available; and
    a job execution scheduler configured to schedule execution of the job at a timing determined in dependence upon an availability of both computing hardware resources and application licenses, including delaying instructing the computing system to execute the job until a time at which reserved computing resources are available.

2. A job scheduling system according to claim 1, wherein:
    if the allocation of the application licenses is available, the license scheduling module is configured to acquire an available allocation of licenses on behalf of the job.

3. A job scheduling system according to claim 1, wherein:
    the license scheduling module is configured to check for availability of the allocation of application licenses on behalf a job until the application licenses are one of reserved and acquired, and until an indicated timing by which the job is to be completed has passed.

4. A job scheduling system according to claim 1, wherein:
    acquiring requested licenses comprises launching a proxy license server for the job, which proxy license server is configured to acquire and hold an available allocation of licenses on behalf of the job.

5. A job scheduling system according to claim 4, wherein the license scheduling module is configured to check whether an allocation of licenses is available one of from a real license server and from proxy license servers of other jobs currently being executed.

6. A job scheduling system according to claim 4, wherein:
    the job information includes an indication of a timing by which the job is to be completed; and
    if the license scheduling module identifies that a checked allocation of application licenses for the job are available from the proxy license server of another job which is scheduled to complete before the timing, the license scheduling module is configured to reserve indicated application licenses for the job and to launch a proxy license server for the job to receive the indicated application licenses from the other job upon completion of the other job.

7. A job scheduling system according to claim 4, wherein the job execution scheduler is configured to notify the license scheduling module upon completion of a job, and the license scheduling module is configured to terminate the proxy license server of the completed job and transfer the application licenses held by the terminated proxy license server to one of a waiting proxy license server and the real license server.

8. A job scheduling system according to claim 1, wherein:
    the job execution scheduler, and the hardware scheduling module are provided as components of a job scheduler; and
    the job information receiving module and the license scheduling module are provided as a separate process configured to interact with the job execution scheduler, the hardware scheduling module, and at least one license server.

9. A method of scheduling job execution timings in a computing system, the method comprising:
    receiving job information defining a job pending execution in the computing system, the job information including an indication of computing hardware resources required to execute the job, and an indication of an allocation of application licenses required to execute the job comprising an indication of an optimum allocation of the application licenses with which the job can be executed;
    reserving the computing hardware resources on behalf of the job;
    calculating a minimum acceptable allocation of the application licenses with which the job can be executed based on the indicated optimum allocation of the application licenses;
    checking for availability of the application licenses on behalf of the job by checking whether the indicated optimum allocation of the application licenses is available, and if not, checking whether an allocation of the application licenses less than the optimum allocation and more than or equal to the minimum acceptable allocation of the application licenses is available; and
    coordinating execution of the job at a timing determined in dependence upon the availability of both computing hardware resources and application licenses including delaying instructing the computing system to execute the job until a time at which reserved computing resources are available.

10. A computing system, comprising:
a job scheduling system configured to schedule job execution timings in a computing system, the job scheduling system comprising:
a processor;
a job information receiving module configured to receive job information defining a job pending execution in the computing system, the job information including an indication of computing hardware resources required to execute the job, and an indication of an allocation of application licenses required to execute the job comprising an indication of an optimum allocation of the application licenses with which the job can be executed;
a hardware scheduling module configured to reserve the computing hardware resources on behalf of the job; and
a license scheduling module configured to calculate a minimum acceptable allocation of the application licenses with which the job can be executed based on the indicated optimum allocation of the application licenses, and to check for availability of the application licenses on behalf of the job by checking whether the indicated optimum allocation of the application licenses is available, and if not, checking whether an allocation of the application licenses less than the optimum allocation and more than or equal to the minimum acceptable allocation of the application licenses is available;
a job execution scheduler configured to schedule execution of the job at a timing determined in dependence upon the availability of both computing hardware resources and application licenses including delaying instructing the computing system to execute the job until a time at which reserved computing resources are available, and computing hardware resources configured to execute scheduled jobs.

11. A non-transitory storage medium storing a computer program which, when executed by a computing apparatus, causes the computing apparatus to function as a job scheduling system configured to schedule job execution timings in a computing system, the job scheduling system comprising:
a job information receiving module configured to receive job information defining a job pending execution in the computing apparatus, the job information including an indication of computing hardware resources required to execute the job, and an indication of an allocation of application licenses required to execute the job comprising an indication of an optimum allocation of the application licenses with which the job can be executed;
a hardware scheduling module configured to reserve the computing hardware resources on behalf of the job;
a license scheduling module configured to calculate a minimum acceptable allocation of the application licenses with which the job can be executed based on the indicated optimum allocation of the application licenses, and to check for availability of the application licenses on behalf of the job by checking whether the indicated optimum allocation of the application licenses is available, and if not, checking whether an allocation of the application licenses less than the optimum allocation and more than or equal to the minimum acceptable allocation of the application licenses is available; and
a job execution scheduler configured to schedule execution of the job at a timing determined in dependence upon the availability of both the computing hardware resources and application licenses, including delaying instructing the computing system to execute the job until a time at which reserved computing resources are available.

12. A non-transitory storage medium storing a computer program which, when executed by a computing apparatus, causes the computing apparatus to perform a method comprising:
receiving job information defining a job pending execution in the computing apparatus, the job information including an indication of computing hardware resources required to execute the job, and an indication of an allocation of application licenses required to execute the job comprising an indication of an optimum allocation of the application licenses with which the job can be executed;
reserving the computing hardware resources on behalf of the job;
calculating a minimum acceptable allocation of the application licenses with which the job can be executed based on the indicated optimum allocation of the application licenses;
checking for availability of the application licenses on behalf of the job by checking whether the indicated optimum allocation of the application licenses is available, and if not, checking whether an allocation of the application licenses less than the optimum allocation and more than or equal to the minimum acceptable allocation of the application licenses is available; and
coordinating execution of the job at a timing determined in dependence upon the availability of both computing hardware resources and application licenses including delaying instructing the computing system to execute the job until a time at which reserved computing resources are available.

* * * * *